(12) United States Patent
Watanabe

(10) Patent No.: US 7,861,235 B2
(45) Date of Patent: Dec. 28, 2010

(54) PROGRAM CONTROL DEVICE AND PROGRAM CONTROL METHOD

(75) Inventor: Manabu Watanabe, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 840 days.

(21) Appl. No.: 11/822,730

(22) Filed: Jul. 9, 2007

(65) Prior Publication Data

US 2008/0010399 A1 Jan. 10, 2008

(30) Foreign Application Priority Data

Jul. 7, 2006 (JP) .............................. 2006-188631

(51) Int. Cl.
*G06F 9/45* (2006.01)
(52) U.S. Cl. ..................................... 717/140
(58) Field of Classification Search .................. 717/140
See application file for complete search history.

(56) References Cited

U.S. PATENT DOCUMENTS

| | | | | |
|---|---|---|---|---|
| 6,382,846 | B1 * | 5/2002 | Lai et al. ..................... | 712/209 |
| 7,437,270 | B2 * | 10/2008 | Song et al. ................... | 702/182 |
| 7,739,453 | B2 * | 6/2010 | Sohm et al. .................. | 717/124 |
| 7,779,206 | B2 * | 8/2010 | Sohm et al. .................. | 717/125 |
| 2005/0155019 | A1 * | 7/2005 | Levine et al. ................ | 717/127 |
| 2005/0155021 | A1 * | 7/2005 | DeWitt et al. ............... | 717/130 |

OTHER PUBLICATIONS

Kumar et al., "Compiling for Instruction Cache Performance on a Multithreaded Architecture", Nov. 2002, University of California.*
Patent Abstracts of Japan, Published Application No. 2001-166948, Published Jun. 22, 2001.
Patent Abstracts of Japan, Published Application No. 2001-216140, Published Aug. 10, 2001.
Patent Abstracts of Japan, Published Application No. 2005-266941, Published Sep. 29, 2005.
Patent Abstracts of Japan, Published Application No. 2003-271394, Published Sep. 26, 2003.
Patent Abstracts of Japan, Published Application No. 08-241208, Published Sep. 17, 1996.
Patent Abstracts of Japan, Published Application No. 2000-066899, Published Mar. 3, 2000.

* cited by examiner

*Primary Examiner*—Wei Y Zhen
*Assistant Examiner*—Junchun Wu
(74) *Attorney, Agent, or Firm*—Staas & Halsey LLP

(57) ABSTRACT

Disclosed is a program control device for managing cache information and generating an optimum linker option to thereby improve use efficiency of a cache memory. A cache line information generating section is formed which, when a target program is loaded into a main memory, generates cache line information. Therefore, the cache line information having memory address information and symbolic information in a function of the target program in a cache line can be displayed with cache performance information. Accordingly, functions causing a cache conflict can be easily specified and rearranged by a linker option so as not to share the same cache line. As a result, the cache misses can be reduced.

10 Claims, 16 Drawing Sheets

| Address | Line | Symbol |
|---------|---------|--------|
| 0x0000 | line_0 | _func |
| 0x0080 | line_4 | _func2 |
| 0x0152 | line_10 | _func3 |
| 0x0388 | line_28 | _func4 |
| ~ | | |
| 0x1020 | line_0 | _sub |
| 0x1088 | line_4 | _sub2 |
| 0x1160 | line_10 | _sub3 |
| ~ | | |

FIG. 4

| Address | Line | Counts |
|---------|---------|--------|
| 0x0000 | line_0 | 72 |
| 0x0080 | line_4 | 12 |
| 0x0152 | line_10 | 4 |
| 0x0388 | line_28 | 4 |
| ~ | | |
| 0x1020 | line_0 | |
| 0x1088 | line_4 | |
| 0x1160 | line_10 | |
| ~ | | |

FIG. 5

| Address | Line | Symbol | Counts |
|---|---|---|---|
| 0x0000 | line_0 | _func | 72 |
| 0x0080 | line_4 | _func2 | 12 |
| 0x0152 | line_10 | _func3 | 4 |
| 0x0388 | line_28 | _func4 | 4 |
| ~ | | | |
| 0x1020 | line_0 | _sub | |
| 0x1088 | line_4 | _sub2 | |
| 0x1160 | line_10 | _sub3 | |
| ~ | | | |

FIG. 6

| Address | Line | Symbol |
|---|---|---|
| 0x0000 | line_0 | _func |
| 0x0080 | line_4 | _func2 |
| 0x0152 | line_10 | _func3 |
| 0x0388 | line_28 | _func4 |
| ~ | | |
| 0x1020 | line_0 | _sub |
| 0x1088 | line_4 | _sub2 |
| 0x1160 | line_10 | _sub3 |
| ~ | | |
| 0x1020 | line_0 | _ret |
| 0x1088 | line_4 | _ret2 |
| 0x1160 | line_4 | _ret3 |

FIG. 9

| Address | Line | Counts |
|---|---|---|
| 0x0000 | line_0 | 72 |
| 0x0080 | line_4 | 12 |
| 0x0152 | line_10 | 4 |
| 0x0388 | line_28 | 4 |
| ~ | | |
| 0x1020 | line_0 | 32 |
| 0x1088 | line_4 | 6 |
| 0x1160 | line_10 | 4 |
| ~ | | |
| 0x1020 | line_0 | 32 |
| 0x1088 | line_4 | 4 |
| 0x1160 | line_4 | 4 |

FIG. 10

| Address | Line | Symbol | Counts |
| --- | --- | --- | --- |
| 0x0000 | line_0 | _func | 72 |
| 0x0080 | line_4 | _func2 | 12 |
| 0x0152 | line_10 | _func3 | 4 |
| 0x0388 | line_28 | _func4 | 4 |
| ~ | | | |
| 0x1020 | line_0 | _sub | 32 |
| 0x1088 | line_4 | _sub2 | 6 |
| 0x1160 | line_10 | _sub3 | 4 |
| ~ | | | |
| 0x1020 | line_0 | _ret | 32 |
| 0x1088 | line_4 | _ret2 | 4 |
| 0x1160 | line_4 | _ret3 | 4 |

FIG. 11

PROGRAM CONTROL DEVICE AND PROGRAM CONTROL METHOD

CROSS-REFERENCE TO RELATED APPLICATIONS

This application is based upon and claims the benefits of priority from the prior Japanese Patent Application No. 2006-188631, filed on Jul. 7, 2006, the entire contents of which are incorporated herein by reference.

BACKGROUND OF THE INVENTION

1. Field of the Invention

The present invention relates to a program control device and a program control method. More particularly, the present invention relates to a program control device for managing cache information and performing program control. The invention also pertains to a method of manufacturing the device.

2. Description of the Related Art

It has been said that even if a processing speed of a CPU (Central Processing Unit) is increased, since the time for preparing data used in calculations or for writing calculation results in external memories becomes a bottleneck, improvement in the processing speed of the whole system is difficult.

Therefore, a cache as a high-speed memory with a small capacity is nowadays disposed between an external memory and a CPU. Thereby, a difference between a processing speed of the CPU and a cost for an access to the external memory can be absorbed, which can contribute to the improvement of the processing speed of the whole system.

However, since the cache is a high-speed memory but has a small capacity, only a small portion of data in the external memory can be stored in the cache.

More specifically, in the case where the CPU fetches data from the cache, when desired data is stored in the cache (cache hit), the data can be directly fetched from the cache.

However, when the desired data is not stored in the cache (cache miss), the data stored in the external memory must be fetched to the cache.

This cache miss causes a bottleneck in improvement of the processing speed of the whole system.

Therefore, for a method for reducing the cache misses and effectively using the cache, for example, the following method is proposed.

FIG. 16 is a flowchart showing a procedure for a conventional program control.

The conventional program control is performed by causing a computer to execute the procedure for the conventional program control shown in FIG. 16. That is, the computer executes the procedure for the program control to function as the conventional program control device.

By the conventional program control device, the following process is performed according to a flowchart shown in FIG. 16.

[Step S1] A project is created and a source program is compiled.

[Step S2] A measure range is set in the source program, if desired.

[Step S3] The source program is converted into a target program by a build process such as compile, assemble or link.

[Step S4] The target program is loaded into a main memory.

[Step S8] When the target program is loaded into the main memory, measurement of cache performance information (a cache hit rate and a cache miss rate) of the target program is executed by a CPU.

[Step S9] The cache performance information is obtained.

[Step S11] The cache performance information is displayed in GUI (Graphical User Interface).

[Step S13] From the displayed cache performance information, it is determined whether the program has sufficient performance. When the program has not sufficient performance, the process goes to step S14.

[Step S14] With reference to the cache performance information obtained in step S9, control is performed such as a change of logic in the program, a structure based on locality of external accesses, preposition to the cache and build options for a compiler.

After the control, the process returns to step S3 and passes through steps S3 to S11 again. In step S13, it is determined whether the program has sufficient performance. If the program has sufficient performance, the process goes to step S15.

[Step S15] A program having sufficient performance is obtained. Judging from the cache performance information, the process returns to step S1 or S3 according to user's need and remeasurement is performed.

Thus, there is proposed a method of displaying the cache hit rate and the cache miss rate by the above-described procedure to thereby generate an optimum linker option to reduce the cache misses.

In addition to the above procedure, there is also proposed a cache information display system (see, e.g., Japanese Unexamined Patent Application Publication No. 8-241208) having a storage function for storing, as internal information, cache information such as the capacity, the number of ways and the line size of the cache; an analysis function for recognizing a loop from the source program and analyzing the access conditions to the data in the loop; and a display function for displaying analysis results of the analysis function.

By the program control and cache information display system described above, information on the cache is displayed. Using this displayed information, a user personally changes a source or provides a compiler with user's known information to perform the program control. As a result, the cache misses can be reduced so that the cache can be effectively used.

However, in performing the above-described conventional program control to reduce the cache misses, the following problem occurs.

In the case of performing the control of the program such as a C language program to reduce the cache misses, the logic and allocation in the cache memory of specific functions from the cache misses must be optimized. In the conventional program control method, however, the cache miss rate is displayed but effects on other functions or variables sharing the same cache line are not found. Therefore, even if a cache conflict occurs between functions or variables, it is difficult to specify the causal function or variable.

SUMMARY OF THE INVENTION

In view of the foregoing, it is an object of the present invention to provide a program control device and program control method for managing cache information and generating an optimum linker option to thereby improve use efficiency of a cache memory.

To accomplish the above objects, according to one aspect of the present invention, there is provided a program control device for managing cache information and performing program control. This device comprises: a building section for converting a received source program into a target program by a build process; a memory loading section for loading the target program into a main memory; a cache line information generating section for generating cache line information having symbolic information and memory address information of the target program; a cache performance information generating section for generating cache performance information having a cache hit rate and cache miss rate of the target program; a cache information merging section for merging the cache line information and the cache performance information to generate cache information; and a cache information displaying section for displaying the cache information.

According to another aspect of the present invention, there is provided a program control method for managing cache information and performing program control. This program control method comprises the steps of: a building step of converting a received source program into a target program by a build process; a memory loading step of loading the target program into a main memory; a cache line information generating step of generating cache line information having symbolic information and memory address information of the target program; a cache performance information generating step of generating cache performance information having a cache hit rate and cache miss rate of the target program; a cache information merging step of merging the cache line information and the cache performance information to generate cache information; and a cache information displaying step of displaying the cache information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4 to 6 are images of internal data according to the first embodiment.

FIGS. 9 to 11 are images of internal data according to the second embodiment.

DESCRIPTION OF THE PREFERRED EMBODIMENTS

Figure 1:
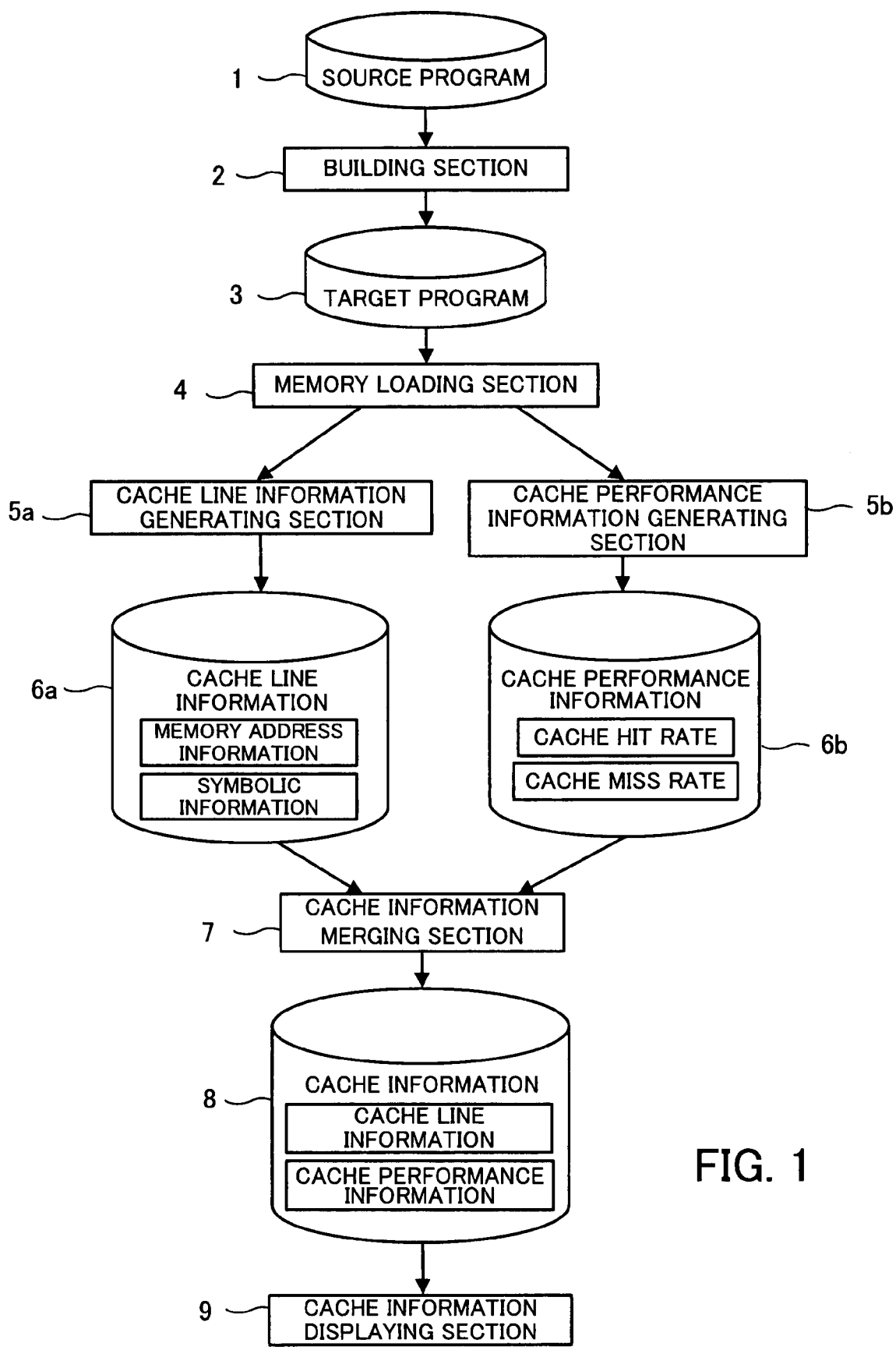
FIG. 1 is a view illustrating a principle of the present invention.

Preferred embodiments of the present invention will be described in detail below with reference to the accompanying drawings, wherein like reference numerals refer to like elements throughout. First, a principle of the present invention will be described.

In the present invention, cache line information and cache performance information are displayed for an application program for a computer having a cache memory and based on the information, a program control is performed. By performing this program control, cache misses can be reduced so that improvement of the memory use efficiency can be realized.

FIG. 1 is a view illustrating a principle of the present invention.

A procedure for the program control according to the present invention includes a building section 2, a memory loading section 4, a cache line information generating section 5a, a cache performance information generating section 5b, a cache information merging section 7 and a cache information displaying section 9.

When a source program 1 is input, a build process such as compile, assemble or link is performed by the building section 2 to generate a target program 3.

The target program 3 is loaded into a main memory by the memory loading section 4 and recognized by the development environment. When the target program 3 is recognized by the development environment, cache line information 6a having symbolic information and memory address information is generated by the cache line information generating section 5a, and cache performance information 6b having a cache hit rate and cache miss rate of the target program 3 is generated by the cache performance information generating section 5b.

The cache line information 6a and the cache performance information 6b are merged by the cache information merging section 7 to generate cache information 8.

In the cache information displaying section 9, the cache information 8 is displayed, for example, in GUI.

In the above-described procedure, as compared with a conventional processing method of the program control, the cache line information 6a is generated by the cache line information generating section 5a, so that functions copied to the same cache line can be easily displayed. Therefore, functions or variables causing a cache conflict can be easily specified and rearranged by a linker option so as not to share the same cache line. As a result, the cache misses can be reduced, and the use efficiency of the cache memory can be improved.

The program control of the present invention is performed by causing a computer to execute the procedure for the program control according to the present invention. That is, the computer executes the procedure for the program control to function as a program control device.

Figure 2:
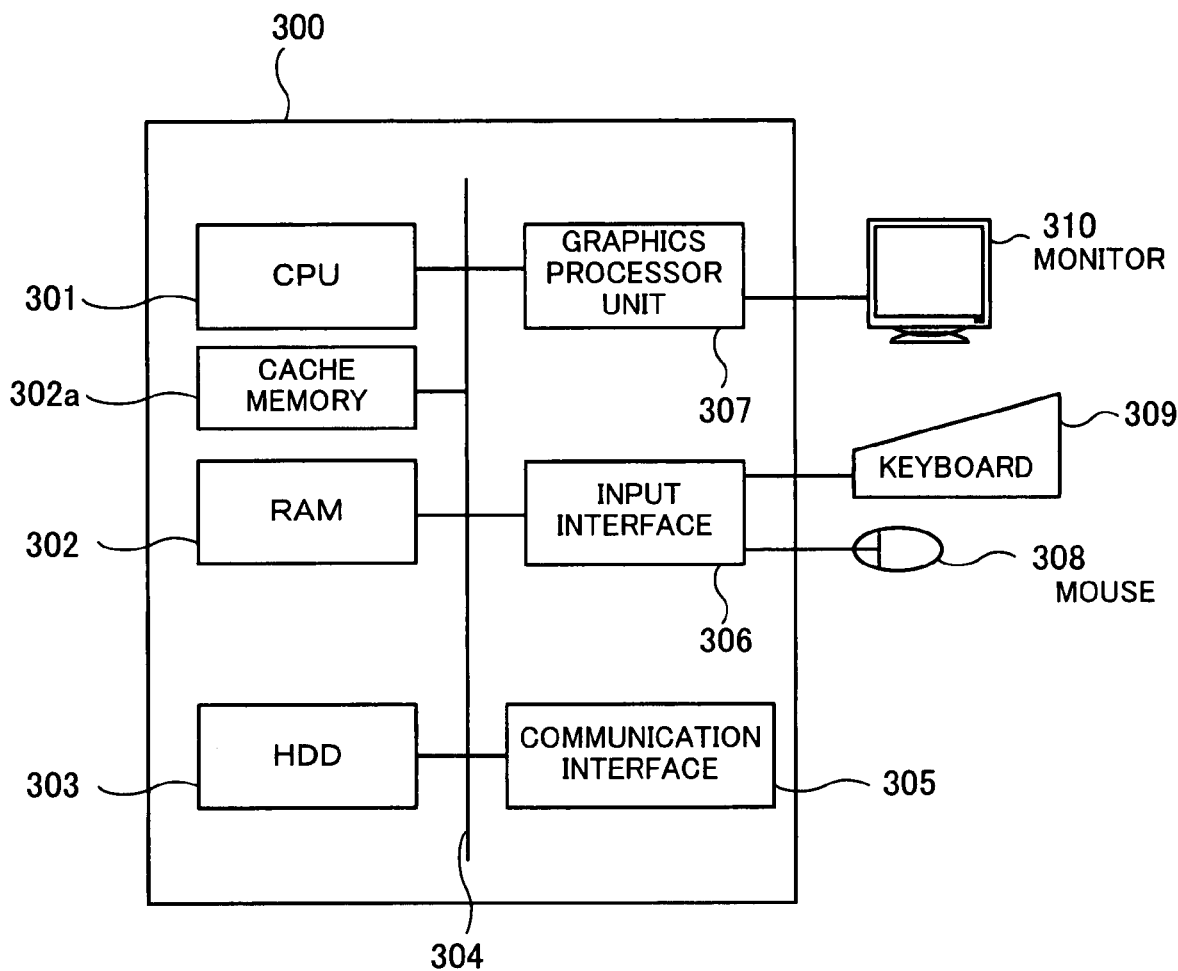
FIG. 2 is a block diagram showing a hardware configuration example of a program control device according to the present invention.

FIG. 2 is a block diagram showing a hardware configuration example of the program control device of the present invention.

As shown in FIG. 2, the whole of a program control device 300 is controlled by a CPU 301. To the CPU 301, a RAM (Random Access Memory) 302, a cache memory 302a, a Hard Disk Drive (HDD) 303, a graphics processor unit 307 to which a monitor 310 is connected, an input interface 306 to which a mouse 308 and a keyboard 309 are connected, and a communication interface 305 are connected via a bus 304. By such a hardware configuration, the procedure for the program control of the present invention is executed so that the program control device 300 can be realized.

The first embodiment will be described below with reference to the accompanying drawings.

Figure 3:
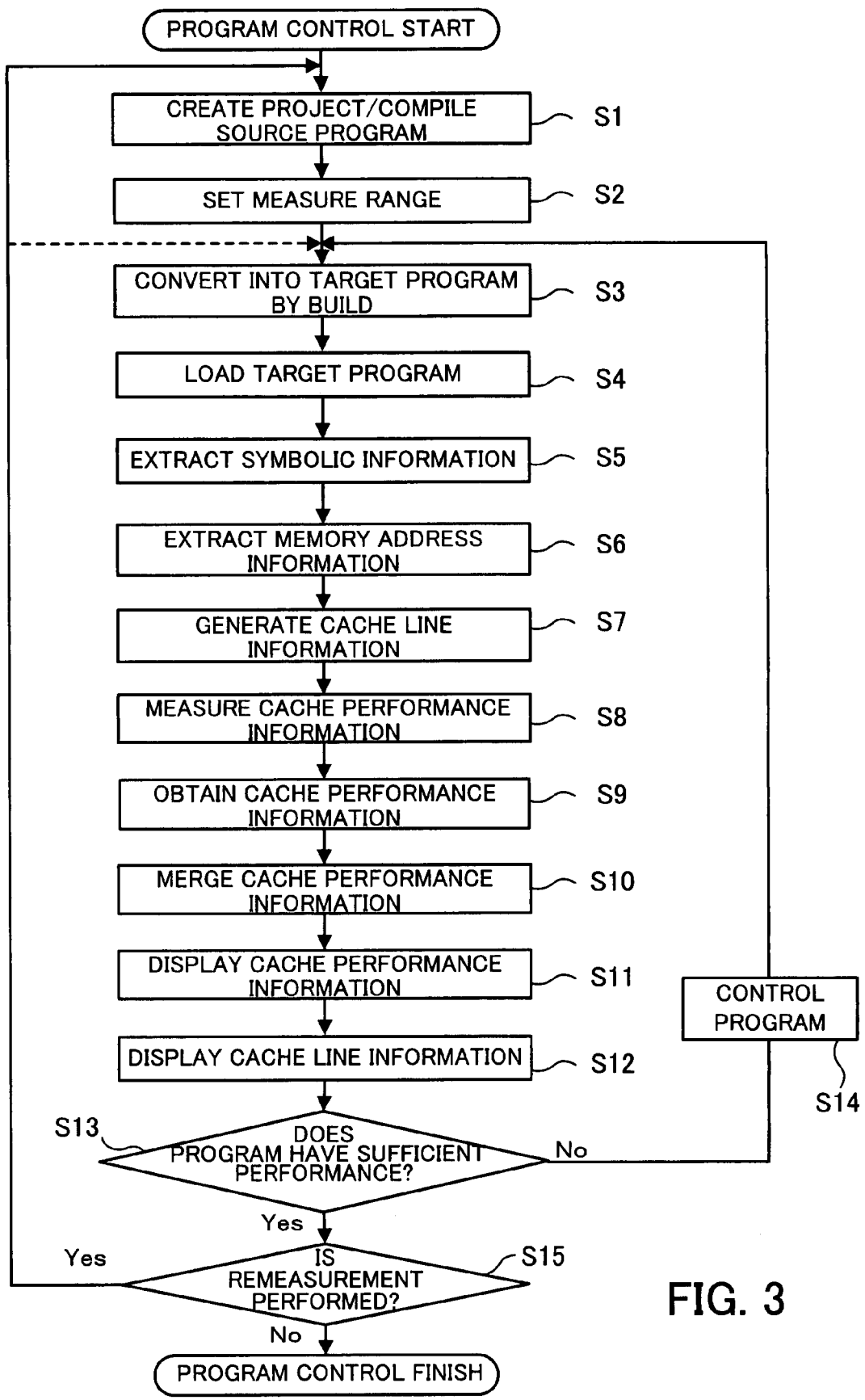
FIG. 3 is a flowchart showing a procedure of a first embodiment.

FIG. 3 is a flowchart showing a procedure of the first embodiment.

The program control according to the first embodiment is performed by causing a computer to execute the procedure for the program control as illustrated in the description of the principle of the present invention. That is, the computer executes the procedure for the program control to function as the program control device.

By such a program control device, the procedure of the first embodiment is realized as shown in FIG. 3.

Figure 16:
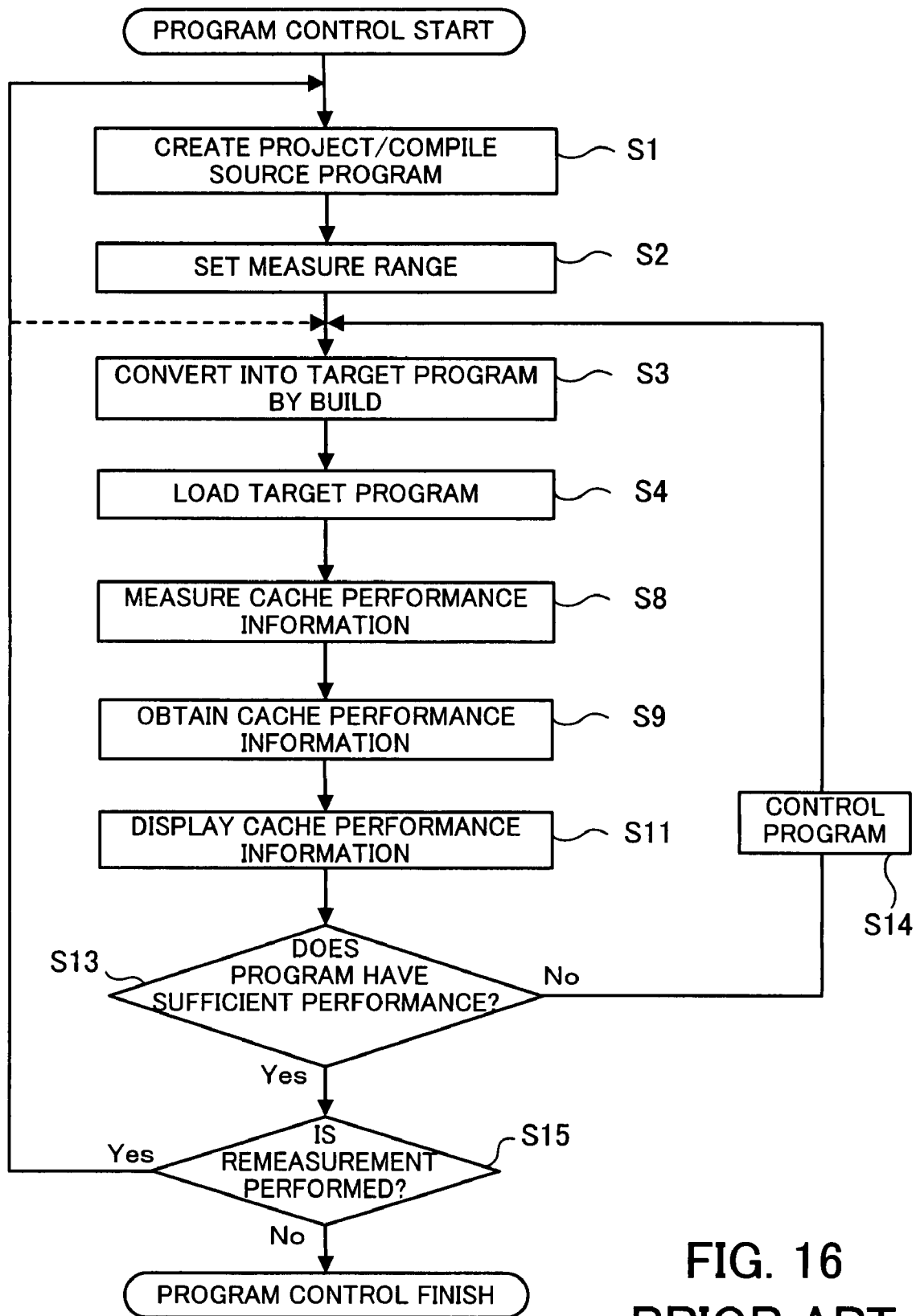
FIG. 16 is a flowchart showing a procedure for a conventional program control.

The procedure for the program control of the first embodiment further includes "extract symbolic information" in step S5, "extract memory address information" in step S6 and "generate cache line information" in step S7 after "load target program" in step S4 of the procedure for the conventional program control shown in FIG. 16. In addition, the procedure further includes "merge cache performance information" in step 10 after "obtain cache performance information" in step S9 and "display cache line information" in step S12 after "display cache performance information" in step S11.

The above-described procedure for the program control of the first embodiment is executed according to the following steps.

[Step S1] A project is created and a source program is compiled.

[Step S2] A measure range is set in the source program, if desired.

[Step S3] The source program is converted into a target program by a build process such as compile, assemble or link.

[Step S4] The target program is loaded into a main memory.

[Step S5] When the target program is loaded into the main memory, the symbolic information and the memory address information are recognized by the development environment. Then, the recognized symbolic information is extracted.

[Step S6] The recognized memory address information is extracted.

[Step S7] In order to find which function of the target program is copied to which cache line, the cache line information having the symbolic information and the memory address information is calculated and managed by using a table.

[Step S8] When the target program is loaded into the main memory, measurement of the cache performance information (a cache hit rate and a cache miss rate) of the target program is executed by a CPU.

[Step S9] The cache performance information is obtained.

[Step S10] The cache line information and the cache performance information are merged and managed by using one table.

[Step S11] The cache performance information is displayed in GUI.

[Step S12] The cache line information is displayed in GUI.

[Step S13] From the displayed cache line information and cache performance information, it is determined whether the program has sufficient performance. When the program has not sufficient performance, the process goes to step S14.

[Step S14] With reference to the cache performance information obtained in step S9, control is automatically or manually performed such as a change of logic in the program, a structure based on locality of external accesses, preposition to the cache and build options for a compiler. After the control, the process returns to step S3 and passes through steps S3 to S11 again. In step S13, it is determined whether the program has sufficient performance. If the program has sufficient performance, the process goes to step S15.

[Step S15] A program having sufficient performance is obtained. Judging from the cache line information and the cache performance information, the process returns to step S1 or S3 according to user's need and remeasurement is performed.

Through the above-described steps, the procedure for the program control according to the first embodiment is completed.

Figure 7:
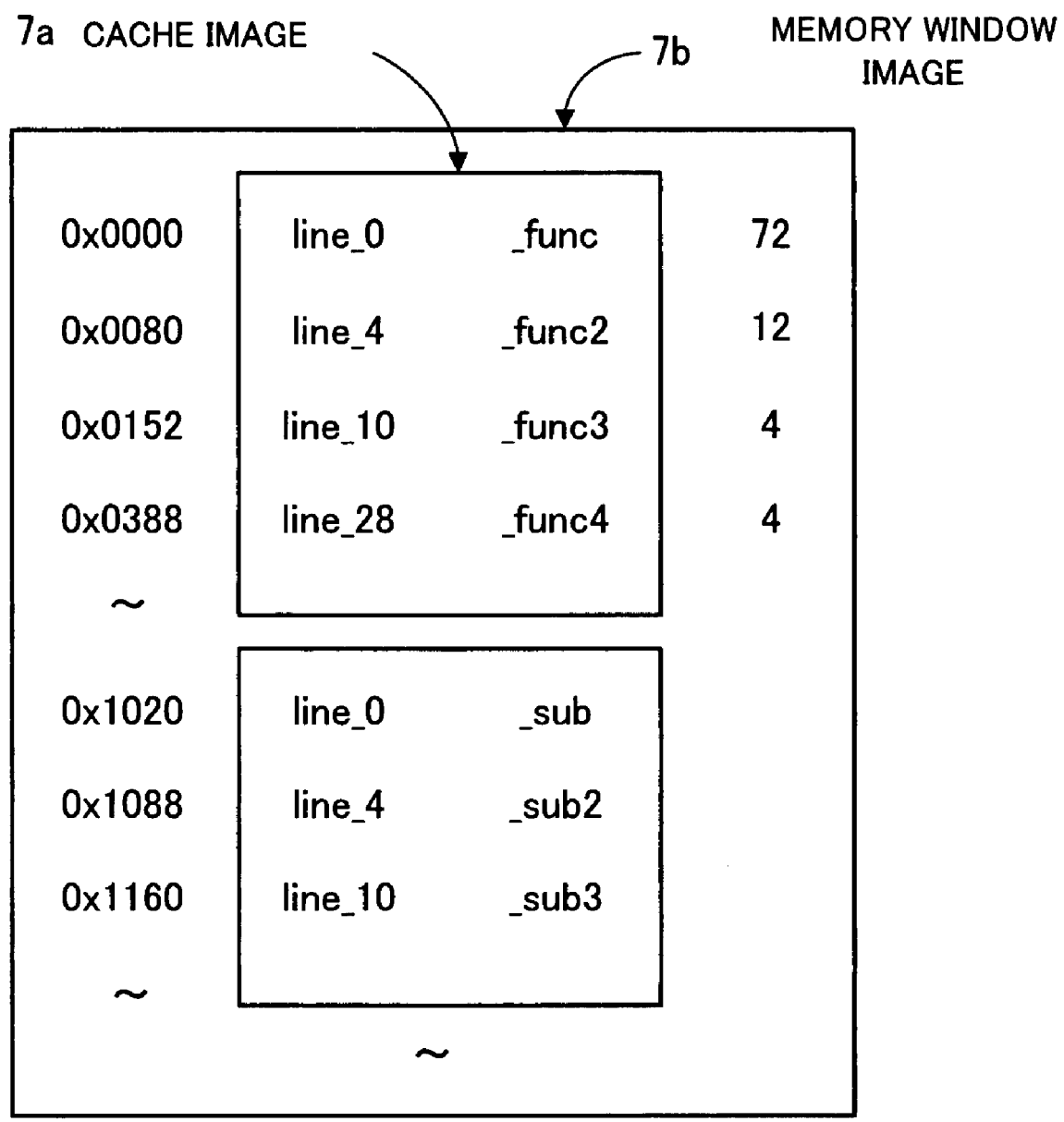
FIG. 7 is an image of the GUI displaying a cache image in a memory window according to the first embodiment.

FIGS. 4 to 6 are images of internal data according to the first embodiment. FIG. 7 is an image of the GUI displaying a cache image in a memory window according to the first embodiment.

The data managed by using a table in the first embodiment will be described below by taking as an example a case where the cache size is 4K bytes and the number of the cache lines is 128 lines (32 bytes/line) in the first embodiment.

Through step S7, the cache line information relating to the correspondences between functions of the target program in the main memory and cache lines is calculated. Further, the memory address information, the cache line and the symbolic information are managed by using a table as shown in FIG. 4.

On the other hand, through step S9, the cache performance information is measured from the target program in the main memory. Further, the cache miss rate is measured and then the memory address information, the cache line and the cache miss rate are managed by using a table as shown in FIG. 5.

Through step S10, the tables of FIGS. 4 and 5 are merged into one table for internal data as shown in FIG. 6. In FIG. 6, the memory address information, cache line, symbolic information and cache miss rate are laid out from left to right and managed as the internal data by using the table. Assume that the cache miss rates for _sub, _sub 2 and _sub 3 in FIG. 6 are not yet measured.

Further, this internal data image is displayed in GUI as a cache image 7*a* in a memory window image 7*b* as shown in FIG. 7.

By passing the above-described procedure, the functions in the target program, which are copied to the same cache line, can be easily displayed. Therefore, functions or variables causing a cache conflict can be easily specified and rearranged by a linker option so as not to share the same cache line. As a result, the cache misses can be reduced and the use efficiency of the cache memory can be improved.

Next, a second embodiment will be described below with reference to the accompanying drawings.

Figure 8:
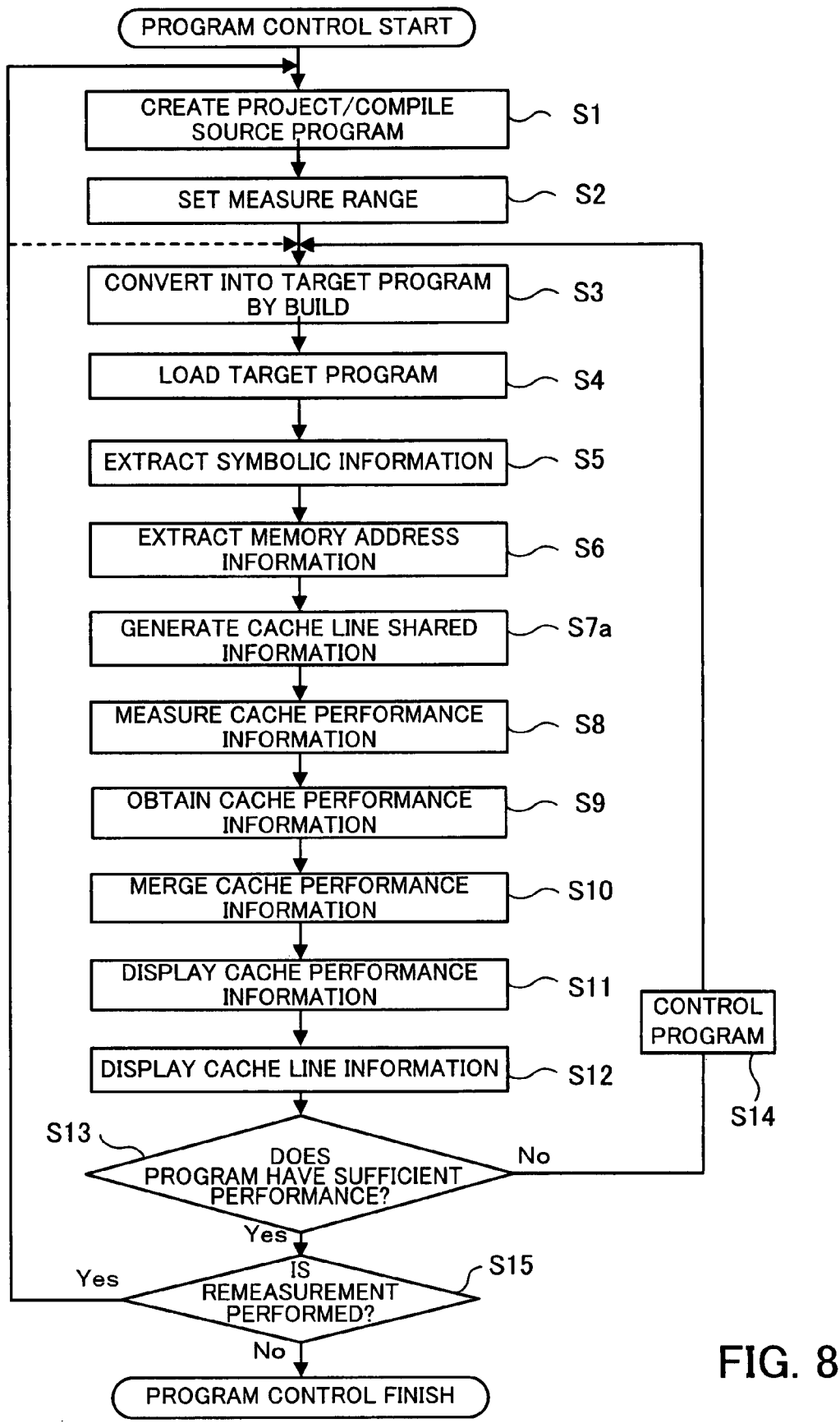
FIG. 8 is a flowchart showing a procedure of a second embodiment.

FIG. 8 is a flowchart showing a procedure of the second embodiment.

In the first embodiment, the flowchart is designed such that the cache line information relating to the correspondences between the functions of the target program in the main memory and the cache lines can be displayed. On the other hand, in the second embodiment, the flowchart is designed such that the information on plural functions and variables sharing the same cache line can be highlighted. In order to realize this flowchart, cache line share information generation in step S7*a* is provided instead of the cache line information generation in step S7.

The program control according to the second embodiment is performed by causing a computer to execute the procedure for the program control as illustrated in the description of the principle of the present invention. That is, the computer executes the procedure for the program control to function as the program control device.

By such a program control device, a flowchart showing the procedure of the second embodiment is realized as shown in FIG. 8.

The above-described procedure for the program control of the second embodiment is executed according to the following steps.

[Step S1] A project is created and a source program is compiled.

[Step S2] A measure range is set in the source program, if desired.

[Step S3] The source program is converted into a target program by a build process such as compile, assemble or link.

[Step S4] The target program is loaded into a main memory.

[Step S5] When the target program is loaded into the main memory, the symbolic information and the memory address information are recognized by the development environment. Then, the recognized symbolic information is extracted.

[Step S6] The recognized memory address information is extracted.

[Step S7a] In order to find which function of the target program is copied to which cache line, the cache line information having the symbolic information and the memory address information is calculated and managed by using a table. The functions that share each cache line are discriminated and then highlighted in the GUI.

[Step S8] When the target program is loaded into the main memory, measurement of the cache performance information (a cache hit rate and a cache miss rate) of the target program is executed by a CPU.

[Step S9] The cache performance information is obtained.

[Step S10] The cache line information and the cache performance information are merged and managed by one table.

[Step S11] The cache performance information is displayed in GUI.

[Step S12] The cache line information is displayed in GUI.

[Step S13] From the displayed cache line information and cache performance information, it is determined whether the program has sufficient performance. When the program has not sufficient performance, the process goes to step S14.

[Step S14] With reference to the cache performance information obtained in step S9, control is automatically or manually performed such as a change of logic in the program, a structure based on locality of external accesses, preposition to the cache and build options for a compiler. After the control, the process returns to step S3 and passes through steps S3 to S11 again. In step S13, it is determined whether the program has sufficient performance. If the program has sufficient performance, the process goes to step S15.

[Step S15] A program having sufficient performance is obtained. Judging from the cache line information and the cache performance information, the process returns to step S1 or S3 according to user's need and remeasurement is performed.

Through the above-described steps, the procedure for the program control according to the second embodiment is completed.

Figure 12:
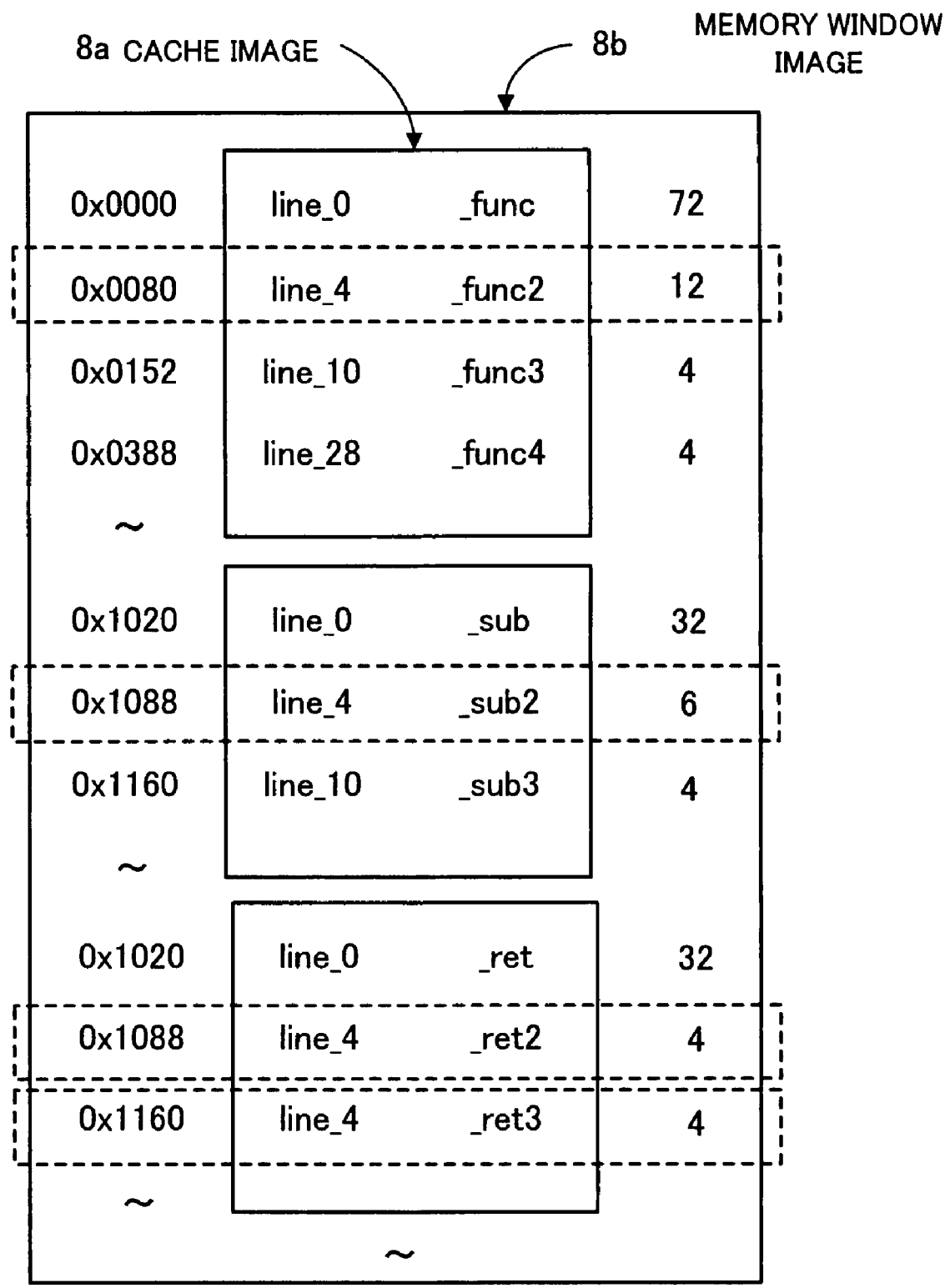
FIG. 12 is an image of the GUI displaying a cache image in a memory window according to the second embodiment.

FIGS. 9 to 11 are images of internal data according to the second embodiment. FIG. 12 is an image of the GUI displaying a cache image in a memory window according to the second embodiment.

In the same manner as in the first embodiment, the data managed by using a table in the second embodiment will be described below by taking as an example a case where the cache size is 4K bytes and the number of the cache lines is 128 lines (32 bytes/line).

Through step S7a, the cache line information relating to the correspondences between the functions of the target program in the main memory and the cache lines, and the information on the functions sharing the same cache line are calculated. Further, the memory address information, the cache line and the symbolic information are managed by using a table as shown in FIG. 9.

On the other hand, through step S9, the cache performance information is measured from the target program in the main memory. Further, the cache miss rate is measured and then the memory address information, the cache line and the cache miss rate are managed by using a table as shown in FIG. 10.

Through step S10, the tables of FIGS. 9 and 10 are merged into one table for internal data as shown in FIG. 11. In FIG. 11, the memory address information, cache line, symbolic information and cache miss rate are laid out from left to right and managed as the internal data by using a table.

Further, this internal data image is displayed in GUI as a cache image Ba in a memory window image 8b as shown in FIG. 12. At this time, information on the functions that share the same Line 4 is highlighted (the information is surrounded by a dotted line in FIG. 12).

By passing the above-described procedure, the functions in the target program, which are copied to the same cache line, can be easily displayed. Therefore, functions or variables causing a cache conflict can be easily specified and rearranged by a linker option so as not to share the same cache line. As a result, the cache misses can be reduced, and the use efficiency of the cache memory can be improved.

Next, a third embodiment will be described below with reference to the accompanying drawings.

Figure 13:
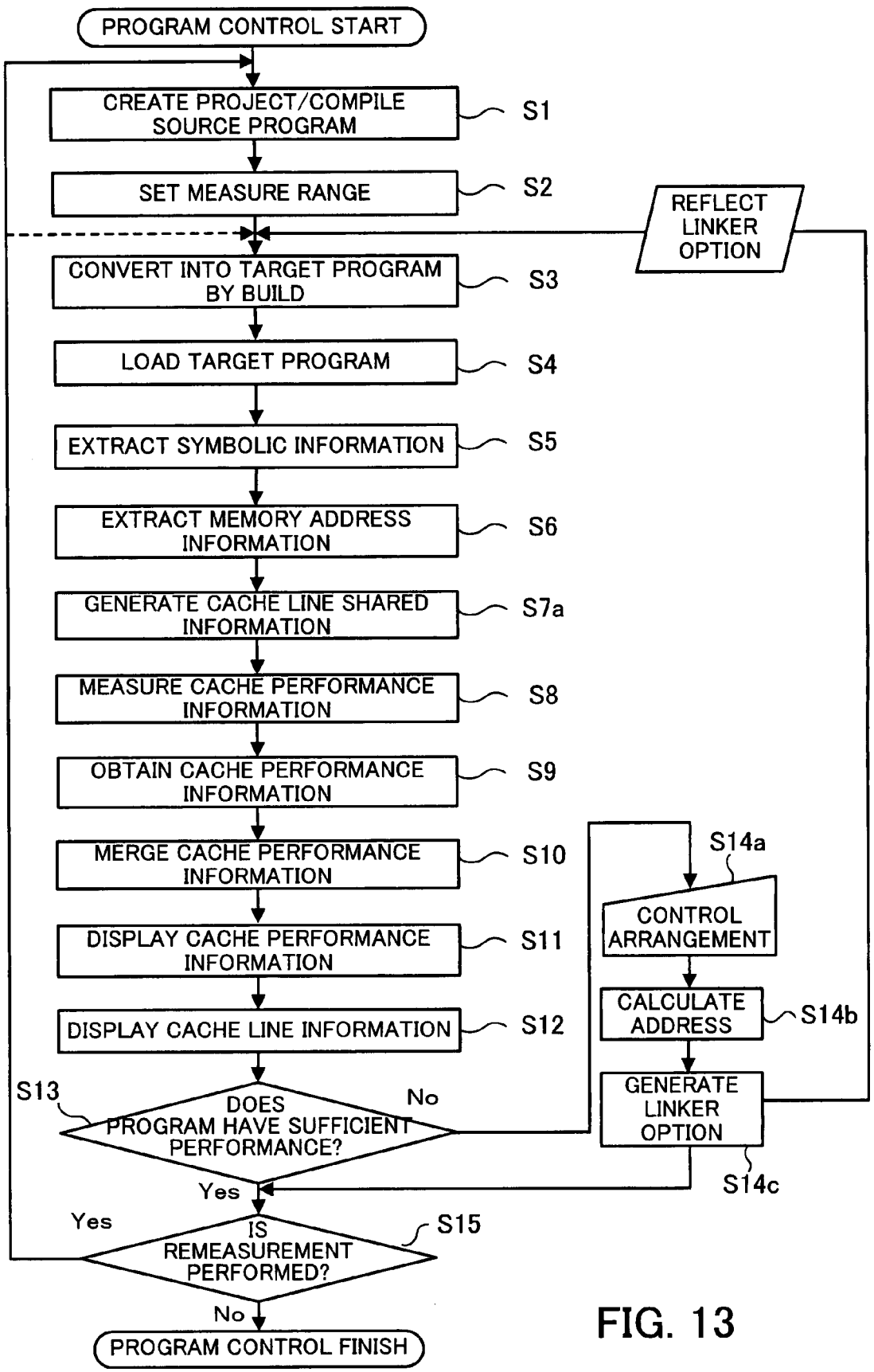
FIG. 13 is a flowchart showing a procedure of a third embodiment.

FIG. 13 is a flowchart showing a procedure of the third embodiment.

In the first embodiment, the flowchart is designed such that the cache line information relating to the correspondences between the functions of the target program in the main memory and the cache lines can be displayed. In the second embodiment, the flowchart is designed such that the information on target program functions sharing the same cache line can be highlighted. In the third embodiment, the flowchart is designed such that an optimum linker option is enabled by providing an arrangement control section in step S14a, an address calculating section in step S14b and a linker option generating section in step S14c, instead of a control section in step S14.

The program control according to the third embodiment is performed by causing a computer to execute the procedure for the program control as illustrated in the description of the principle of the present invention. That is, the computer executes the procedure for the program control to function as the program control device.

By such a program control device, a flowchart showing the procedure of the third embodiment is realized as shown in FIG. 13.

The above-described procedure for the program control of the third embodiment is executed according to the following steps.

[Step S1] A project is created and a source program is compiled.

[Step S2] A measure range is set in the source program, if desired.

[Step S3] The source program is converted into a target program by a build process such as compile, assemble or link.

[Step S4] The target program is loaded into a main memory.

[Step S5] When the target program is loaded into the main memory, the symbolic information and the memory address information are recognized by the development environment. Then, the recognized symbolic information is extracted.

[Step S6] The recognized memory address information is extracted.

[Step S7a] In order to find which function of the target program is copied to which cache line, the cache line information having the symbolic information and the memory address information is calculated and managed by using a table. The functions that share each cache line are discriminated and then highlighted in GUI.

[Step S8] When the target program is loaded into the main memory, measurement of the cache performance information (a cache hit rate and a cache miss rate) of the target program is executed by a CPU.

[Step S9] The cache performance information is obtained.

[Step S10] The cache line information and the cache performance information are merged and managed in one table.

[Step S11] The cache performance information is displayed in GUI.

[Step S12] The cache line information is displayed in GUI.

[Step S13] From the displayed cache line information and cache performance information, it is determined whether the program has sufficient performance. When the program has not sufficient performance, the process goes to step S14a.

[Step S14a] Rearrangement of the functions is performed by drug and drop operations on GUI by a user. Alternatively, the arrangement is controlled by a specific algorithm.

[Step S14b] For arrangement after the arrangement control, a boundary alignment value is calculated and an address after the rearrangement is calculated and displayed.

[Step S14c] A linker option for performing the rearrangement is generated and then, the process goes to step S15. Further, the generated linker option is reflected on the target building section in step S3, if desired.

[Step S15] A program having sufficient performance is obtained. Judging from the cache line information and the cache performance information, the process returns to step S1 or S3 according to user's need and remeasurement is performed.

Through the above-described steps, the procedure for the program control according to the third embodiment is completed.

Figure 14:
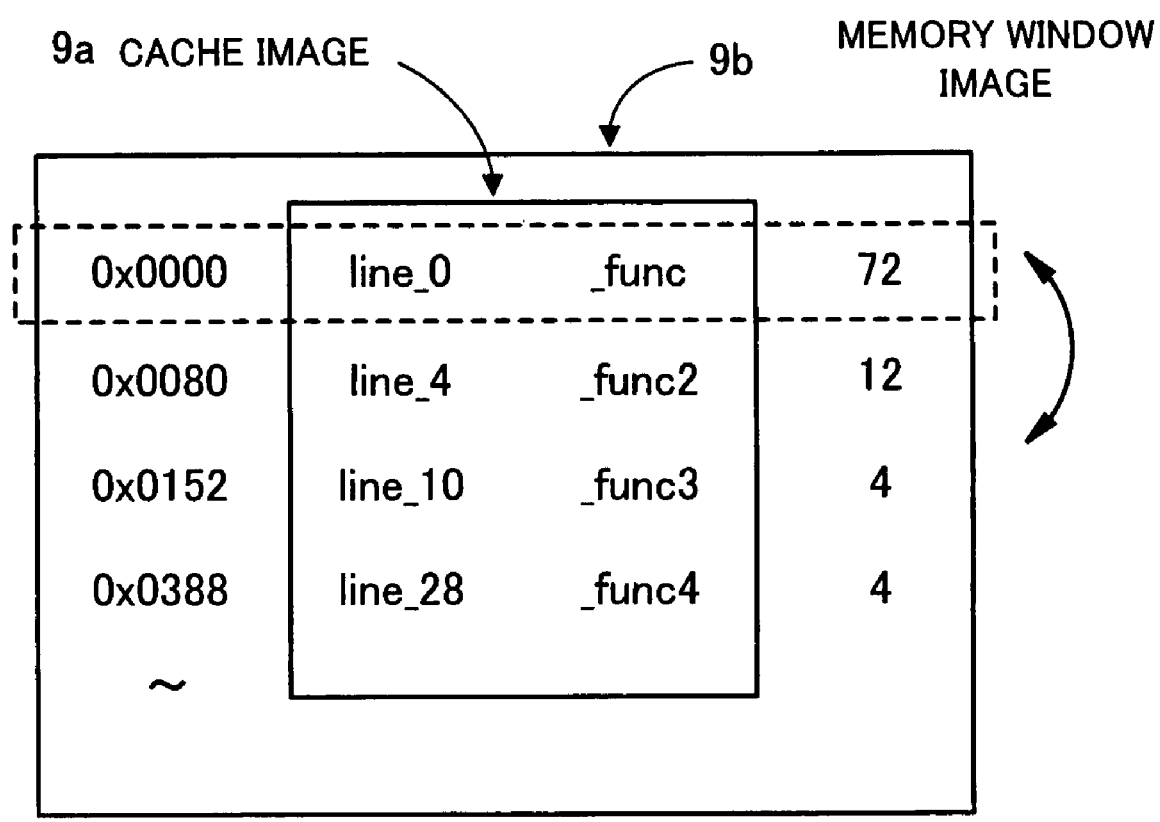
FIG. 14 is an image of the GUI displaying a cache image in a memory window according to the third embodiment.
Figure 15:
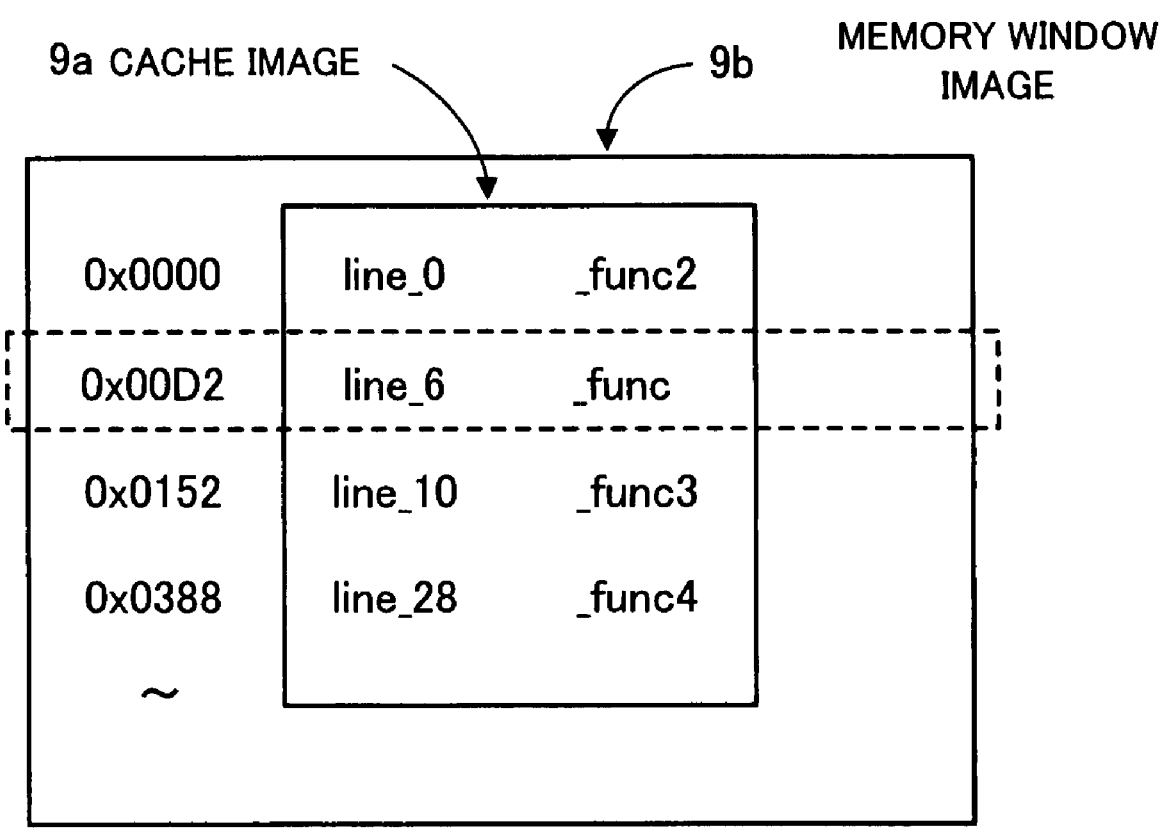
FIG. 15 is an image of the GUI displaying the cache image after rearrangement in the memory window according to the third embodiment.

FIG. 14 is an image of GUI displaying the cache image in the memory window according to the third embodiment. FIG. 15 is an image of GUI displaying the cache image after the rearrangement in the memory window according to the third embodiment.

In the same manner as in the first and second embodiments, the data managed by using a table in the third embodiment will be described below by taking as an example a case where the cache size is 4K bytes and the number of the cache lines is 128 lines (32 bytes/line).

In the same manner as in the second embodiment, the internal data obtained through steps S7a and S9 and managed by using a table is merged into one table through step S10.

This merged internal data image is displayed in the GUI as a cache image 9a in a memory window image 9b as shown in FIG. 14. At this time, information on the functions that share the same line_0 is highlighted (the information is surrounded by a dotted line in FIG. 14).

In the cache image 9a displayed in FIG. 14, when _func with high cache miss rates is rearranged, for example, with _func2 by drug and drop operations, addresses after the rearrangement are calculated and a linker option for the rearrangement is generated. Thus, the cache image after the rearrangement is displayed as shown in FIG. 15. The cache miss rate after the rearrangement is not yet measured in FIG. 15.

Further, the generated linker option can be reflected on the target building section in step S3, if desired.

By passing the above-described procedure, the functions in the target program, which are copied to the same cache line, can be easily displayed. Therefore, functions or variables causing a cache conflict can be easily specified and rearranged by a linker option so as not to share the same cache line. As a result, the cache misses can be reduced and the use efficiency of the cache memory can be improved.

In the present invention, the cache line information generating section is formed which, when the target program is loaded into the main memory, generates the cache line information. Therefore, the cache line information having the memory address information and symbolic information in the function of the target program in the cache line can be displayed with the cache performance information. Accordingly, functions causing a cache conflict can be easily specified and rearranged by a linker option so as not to share the same cache line. As a result, the cache misses can be reduced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A program control device for managing cache information and performing program control, comprising:
    a building section for converting a received source program into a target program by a build process;
    a memory loading section for loading the target program into a main memory;
    a cache line information generating section for generating cache line information having symbolic information and memory address information of the target program;
    a cache performance information generating section for generating cache performance information having a cache hit rate and cache miss rate of the target program;
    a cache information merging section for merging the cache line information and the cache performance information to generate cache information; and
    a cache information displaying section for displaying the cache information.

2. The program control device according to claim 1, wherein:
    in the cache line information generating section, functions in the target program are discriminated with the cache line information, the program sharing the same cache line; and
    in the cache information displaying section, the discriminated functions are displayed with the cache information.

3. The program control device according to claim 2, further comprising:
    an arrangement control section for rearranging the functions using the discriminated functions and the cache information;
    an address calculating section for calculating an address after the rearrangement; and
    a linker option generating section for generating a linker option for the rearrangement.

4. The program control device according to claim 3, wherein one of a drug and drop operation and a specific algorithm is used for the rearrangement.

5. The program control device according to claim 2, wherein the functions are highlighted.

6. A program control method for managing cache information and performing program control, comprising:
- a building step of converting a received source program into a target program by a build process;
- a memory loading step of loading the target program into a main memory;
- a cache line information generating step of generating cache line information having symbolic information and memory address information of the target program;
- a cache performance information generating step of generating cache performance information having a cache hit rate and cache miss rate of the target program;
- a cache information merging step of merging the cache line information and the cache performance information to generate cache information; and
- a cache information displaying step of displaying the cache information.

7. The method according to claim 6, wherein:
- in the cache line information generating step, functions in the target program, which share the same cache line, are discriminated with the cache line information; and
- in the cache information displaying step, the discriminated functions are displayed with the cache information.

8. The method according to claim 7, further comprising:
- an arrangement control step of rearranging the functions using the discriminated functions and the cache information;
- an address calculating step of calculating an address after the rearrangement; and
- a linker option generating step of generating a linker option for the rearrangement.

9. The method according to claim 8, wherein one of a drug and drop operation and a specific algorithm is used for the rearrangement.

10. The method according to claim 7, wherein the functions are highlighted.

* * * * *